United States Patent [19]
Wienholt

[11] Patent Number: 5,732,804
[45] Date of Patent: Mar. 31, 1998

[54] HYDROKINETIC TORQUE CONVERTER WITH LOCKUP CLUTCH

[75] Inventor: Hans-Wilhelm Wienholt, Dortmund, Germany

[73] Assignee: Fichtel & Sachs AG, Schweinfurt, Germany

[21] Appl. No.: 541,061

[22] Filed: Oct. 11, 1995

[30] Foreign Application Priority Data

Oct. 11, 1994 [DE] Germany .................. 44 36 276.5
Mar. 11, 1995 [DE] Germany ................ 195 08 855.7

[51] Int. Cl.⁶ ............................................. F16H 45/02
[52] U.S. Cl. .................. 192/3.29; 192/113.34; 192/113.3; 192/54.3
[58] Field of Search ............................ 192/3.29, 54.3, 192/113.3, 113.34, 113.35, 113.36

[56] References Cited

U.S. PATENT DOCUMENTS

| | | |
|---|---|---|
| 2,856,050 | 10/1958 | Mathews . |
| 3,805,935 | 4/1974 | Armstrong . |
| 4,445,599 | 5/1984 | Bopp . |
| 4,462,492 | 7/1984 | Mueller .................. 192/3.29 |
| 4,930,608 | 6/1990 | Schenk et al. ............ 192/3.29 |
| 4,969,543 | 11/1990 | Macdonald ............... 192/3.29 |
| 5,215,173 | 6/1993 | Gimmler .............. 192/3.29 X |
| 5,248,016 | 9/1993 | Umezawa . |
| 5,310,033 | 5/1994 | Shibayama . |
| 5,501,309 | 3/1996 | Walth et al. ............. 192/3.29 |

FOREIGN PATENT DOCUMENTS

| | | |
|---|---|---|
| 0428248 | 5/1991 | European Pat. Off. . |
| 1258842 | 3/1961 | France . |
| 3543013 | 6/1987 | Germany . |
| 4338072 | 10/1994 | Germany .................. 192/113.36 |
| 4420959 | 1/1995 | Germany . |
| 3-51565 | 3/1991 | Japan . |
| 5306742 | 11/1993 | Japan . |
| 6-6798 | 1/1994 | Japan . |
| 6-42606 | 2/1994 | Japan .................... 192/3.29 |
| 9313339 | 7/1993 | WIPO . |

*Primary Examiner*—Rodney H. Bonck
*Attorney, Agent, or Firm*—Nils H. Ljungman and Associates

[57] ABSTRACT

A hydrokinetic torque converter is provided with a lockup clutch which comprises a piston which can be displaced in the axial direction and can be connected with the converter housing by means of at least one friction lining. The piston, on its side facing the converter housing, defines a chamber in which, when the lockup clutch is active, a pressure is applied which is lower than the pressure of the converter circuit. In the vicinity of the friction surface, there is at least one depression for the flow of hydraulic fluid from the converter circuit. The depression empties in the vicinity of the radially inner end of the friction lining into the chamber, and has at least one connection to at least one recess in the piston, whereby the recess is designed to generate a pressure reduction with respect to the pressure in converter circuit, and is designed with a smaller cross section area than the connection or the depression.

15 Claims, 5 Drawing Sheets

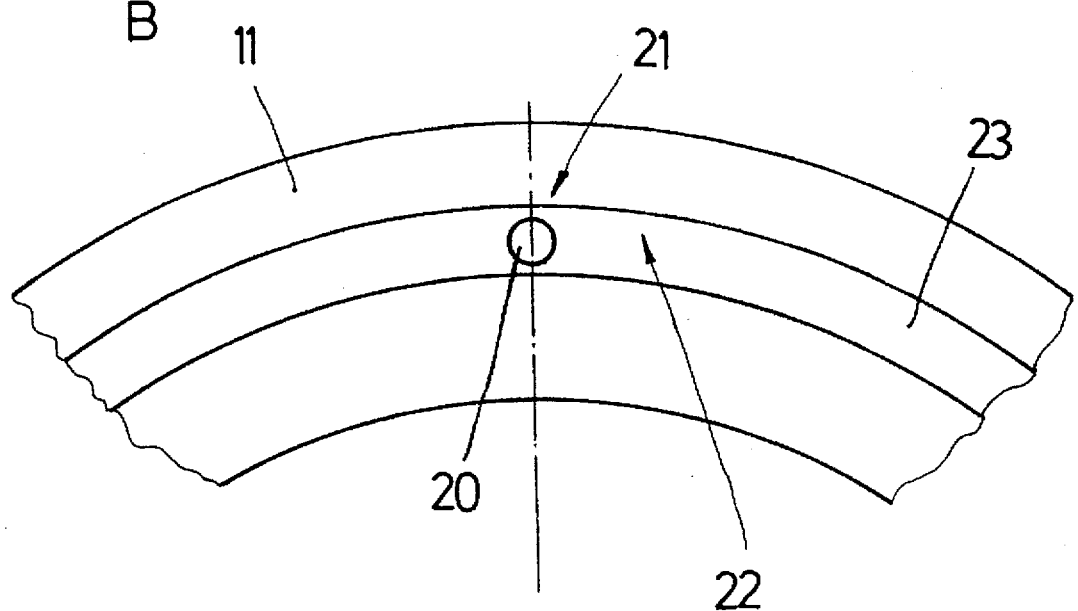
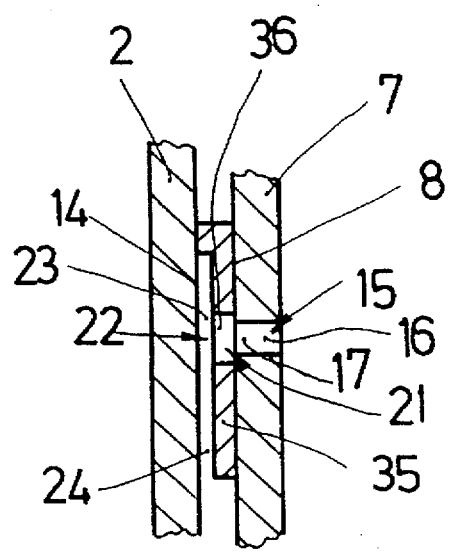

6
HYDROKINETIC TORQUE CONVERTER WITH LOCKUP CLUTCH

BACKGROUND OF THE INVENTION

1. Field of the Invention

This invention relates to a hydrokinetic torque converter with a lock-up clutch.

2. Background Information

WO 93/13 339 discloses a hydrokinetic torque converter with a lockup clutch, the piston of which can be displaced in the axial direction, and between the piston and a counterpressure plate which is connected to the converter housing, there is a plate with friction linings attached on both sides. The friction linings are designed with grooves which are provided for the flow of a hydraulic fluid, such as oil. The oil originates from the converter circuit, and after entering from radially outside, flows through the depressions into a chamber formed between the piston and the converter housing. The oil flowing through the depressions generates a pressure which counteracts the pressure exerted by the converter circuit on the piston, which pressure is at a maximum radially outside at the entry point of the oil, and causes a reduction of the application force of the piston against the plate, and thus on the counterpressure plate. Separation losses are thereby experienced.

In torque converters with friction linings which are provided with depressions, the determination of the number of depressions and of their flow cross sections poses problems in the design phase, since on one hand, when the number of recesses is insufficient, or when the cross section of the recesses is too small, the volume of the oil flowing through the recesses can be too small for effective cooling, and on the other hand, when there are too many recesses, or when they have too large a cross section, there are significant separation losses between the friction linings and the corresponding converter component, which result in an undesirable reduction of the torque which can be transmitted.

Understandably, therefore, the optimization of the friction linings with regard to the recesses requires extensive testing, which is a time-consuming and expensive process.

A comparatively simple cooling system for the friction lining is described in European Patent No. 0 428 248 A2, whereby there are recesses in the piston which empty into the friction lining, and from there are connected to the converter circuit by channels which run radially outward. But this configuration affects only a very limited cooling of the friction lining, since the same pressure exists at the recesses in the piston and at the radially outer exit of the channels, so that the flow through the recesses formed by the channels is provided only by the centrifugal force generated during operation of the lockup clutch.

U.S. Pat. No. 4,445,599 discloses another lockup clutch in which the piston has a recess which is connected to depressions which empty into a chamber which is located radially inside the friction linings. In this embodiment of the lockup clutch, the pressure differential between the converter circuit and the chamber is used to guarantee an adequate flow through the recesses, but the cooling action which can be achieved is very low, because although the recesses are located on one side of the piston, the friction lining which comes into contact by means of its friction surface with another converter element, is located on the other side of the piston. Heat which is generated at the friction surface must accordingly be transmitted through the friction lining, which acts as an insulator, and through the piston, before it can be discharged to the oil flowing through the recesses.

OBJECT OF THE INVENTION

The object of the invention is to design a lockup clutch for a hydrokinetic torque converter so that the flow volume of the oil coming from the converter circuit, and which flows through depressions in the vicinity of the friction surface, can be correctly and precisely adjusted to meet the current requirements with little effort in terms of testing.

SUMMARY OF THE INVENTION

The invention teaches that this object can be accomplished by employing the features of a hydrokinetic torque converter with a lockup clutch which comprises a piston which can be displaced in the axial direction and can be connected to the converter housing by means of at least one friction lining, which piston, on its side facing the converter housing, defines a chamber in which, when the lockup clutch is active, a pressure is applied which is lower than the pressure in the converter circuit, and in the vicinity of the friction surface there is at least one depression for the flow of hydraulic fluid from the converter circuit, preferably oil, which empties into the chamber in the vicinity of the radially inner end of the friction lining. As a result of the measure whereby the recess is provided with a smaller cross section area than the depression, or than the connection between the depression and the recess, the recess acts as a throttle which significantly reduces the pressure of the oil coming from the converter circuit, before the oil can enter into the connection and then into the depression. Downstream of the recess, however, there is only a small pressure loss, since the oil flowing through, after leaving the comparatively narrow recess, can flow into the significantly larger connection, and since the depression also has a sufficient cross section, the oil no longer needs to be forced through another bottleneck. Therefore, with an appropriate sizing of the recess which acts as a throttle, the pressure difference between the input of this recess and the output of the depression can be specified, whereby this pressure difference can be used to influence the volume of oil flowing through the depression. If it is determined in the context of testing operations that the volume flow is insufficient to achieve a satisfactory cooling of the friction surface, then the volume of the oil flow can be increased merely by enlarging the recess in the piston, e.g. by drilling out the hole, while to reduce the volume of the flow, the recess can be narrowed.

Regardless of the respective volume of oil flowing through the depression, the invention teaches that it is possible to eliminate the problem of separation losses which are caused by the oil flowing through the depressions, on account of a counterpressure exerted by the oil, which in turn can reduce the amount of torque which can be transmitted. The invention teaches that this problem can be solved if the pressure at the recess and thus at the piston is already reduced, so that the oil, when it reaches the depressions, can no longer build up any counterpressure which is exerted in the vicinity of the friction surfaces, and leads to both separation losses and to a reduction of the amount of torque which can be transmitted.

Since, on account of the recess in the piston, it is no longer necessary to adapt the dimensions and geometry of the depressions to the respective application, a lockup clutch can be used in different torque converters. It goes without saying that the number of different parts which must be manufactured can thereby be reduced.

Another feature of the invention relates to an advantageous path for the connection between the recess and the depression, whereby the connection in a lockup clutch with only one friction surface can extend through a single component, while in the embodiment disclosed infra, in which there are a number of friction surfaces, the connection can run through additional converter components, such as the plate which is used to hold the friction linings. Regardless of the respective length of the connection, it is essential that its cross section area must be larger than that of the recess. Yet another feature of the invention relates to a particularly simple embodiment for the connection, since the connection in this case can be produced very simply in the form of a boring.

Yet a further feature of the invention relates to a geometry for the depression, as a result of which the friction surface can be cooled over its entire peripheral surface, and the oil, after performing its cooling function, can be discharged from the friction area over the shortest possible path.

During the operation of a lockup clutch, the piston is pressed toward the converter housing by a comparatively low pressure for the transmission of low torques. It is impossible to completely prevent undesirable slip on the friction surfaces, which means that a great deal of heat must be discharged. Moreover, on pistons which are required to function without a torsional vibration damper, in one type of operation which makes it possible to damp torsional vibrations, a precisely specified slip is allowed to take place at the friction surfaces. This slip generates a significant amount of heat. Accordingly, under just such operating conditions in which slip occurs, regardless of whether the slip is desirable or undesirable, an intensive cooling of the friction surfaces is necessary, which requires an increased quantity of oil flowing in the depressions. On the other hand, for the transmission of high torques, a high pressure is generally applied to the piston, so that there is hardly any slip on the friction surfaces. Consequently, under these operating conditions, only a small amount of cooling oil is required in the depressions. In that case, to prevent the oil which is flowing through the depressions from behaving in a manner which is exactly the opposite of what is desired, namely that the volume flow increases with increasing pressure on the side of the piston facing the converter circuit, as disclosed infra, a measure whereby, when low torques are to be transmitted, and consequently when a low pressure is generated by the converter circuit, the depressions are opened on all sides, and consequently allow a significant volume of the oil to flow past, while when higher torques are to be transmitted, and consequently a higher pressure is generated by the converter circuit, at least some of these recesses are closed by the closing device. As a result, the volume of the flow in the depressions is significantly reduced. Yet another feature of the invention relates to a refinement of the embodiment disclosed infra, whereby when different torques are to be transmitted, a particularly precise control of the amount of oil flowing through the respective depressions can be achieved by actuating the closing devices independently of one another.

Still a further feature of the invention relates to an embodiment of the above mentioned closing device. The following technical principle is employed: a first blade ring is connected to the turbine wheel as disclosed in the claim, and accordingly rotates around the converter axis at the speed of rotation of the turbine wheel. A second blade ring, on the other hand, is fastened to the piston, and is driven synchronously or quasi-synchronously with the converter housing. As soon as the piston, on its side facing the turbine wheel, is no longer subjected to the full pressure, and accordingly there is no longer a slip-free frictional connection between it and a plate which is non-rotationally fastened to the turbine wheel by means of a first friction lining on the one hand, and between this plate and the converter housing by means of a second friction lining on the other hand, the turbine wheel is driven by the plate with slip with respect to the converter housing and the piston, and thus with a relative motion with respect to them. Consequently, the first ring gear which corresponds to the turbine wheel is driven at a speed of rotation which is different from the second ring gear which is fastened to the piston. This speed differential creates a peripheral force on the surface of the blades of the two blade rings, whereby this peripheral force increases with the square of the speed differential. The blade of the second blade ring, seen in the circumferential direction, is designed so that it can execute a limited deflection movement, preferably in the peripheral direction, with respect to the peripheral force, and can thereby impart a movement in the circumferential direction to a corresponding closing element, by means of which the recess in the piston is at least partly exposed. Thus, oil which is in contact under pressure against the side of the piston facing the turbine wheel can penetrate into the recess in the manner described above. Accordingly, when the slip on the friction linings increases, the recess is reopened on account of the speed differential between the blade rings described in the claims, and oil can flow from the converter unit through the recess to cool the friction linings. Above a specified speed differential between the blade rings, the recess is open all the way.

One essential feature of the solution taught by the invention is therefore the displacement in the circumferential direction of the blades of the blade ring which is firmly connected to the piston. Consequently, as disclosed infra, the displacement of the blade can be achieved if the blade is fastened by at least one fixation point to the piston, and if the blade can be deformed with respect to this fixation point in the circumferential direction, under the action of the peripheral force. During this displacement movement, the closing element can be moved relative to the corresponding recess by being carried driven by the blade. The deformation of the blade is preferably kept within the elastic range, so that when the peripheral force decreases on account of a reduction of the speed differential between the two blade rings, the blade returns to its idle position, in which it closes the recess. As disclosed infra, on the other hand, the blades of the second blade ring can be attached to the piston in a hinged manner, and can be secured in this position by an energy storage mechanism. When the above mentioned peripheral force is applied, the blade can be displaced against the force of the deforming energy storage device, so that the recess can be at least partly exposed. On the other hand, a reduction of the peripheral force, as a result of the action of the energy storage mechanism, results in a return of the blade to its idle position, and thus a closing of the recess. Still another feature of the invention relates to how the closing element can be advantageously designed on the blade.

In one embodiment of the invention, it can be advantageous, when there are a multiplicity of recesses, not to open or close them simultaneously, but in a specified sequence. For this purpose, in another embodiment of the invention, each recess is provided with a blade, whereby the blades are realized so that they have different rigidities in the circumferential direction. The number of different rigidities is determined by the required number of stages or gears or speeds through which the system must be shifted, until all the recesses are open. The same objective is pursued in another embodiment of the invention, whereby instead of blades which are elastic in the circumferential direction being fastened to the piston, the blades are attached to the piston by hinges, so that by means of an appropriate selection of the energy storage mechanisms which support the blades with regard to their deformation resistance, the closing device can be provided with a multi-stage capability.

Regardless of whether the second blade ring has only one blade or a multiplicity of blades, it may be advantageous to provide each blade with a stop, as disclosed infra, to limit the displacement distance in the direction of the peripheral force. The blade, as also disclosed infra, is preferably either fixed on one end or held on the piston in a hinged manner, so that, when viewed in the circumferential direction, it can execute a pivoting movement around its fixation point. The closing element participates in this pivoting movement, whereby the distance of the closing element in the circumferential direction is determined by the radial distance from the fixation point.

Still another feature of the invention relates to an arrangement of the two blade rings with respect to one another, in which as little space as possible is occupied in the axial direction, but in which the action claimed by the invention is still obtained.

Yet a further feature of the invention relates to a particularly appropriate configuration of the recess, since it can be very easily manufactured by boring the hole, and if it should be necessary to enlarge the cross section, the hole can be easily drilled out to enlarge it.

BRIEF DESCRIPTION OF THE DRAWINGS

Embodiments of the invention are illustrated in the accompanying drawings and are explained in greater detail below.

FIG. 4 is the same as FIG. 3, but seen from direction B in FIG. 2;

FIG. 5 is the same as FIG. 2, but with only one friction surface between piston and converter housing;

DESCRIPTION OF THE PREFERRED EMBODIMENT

Figure 1:
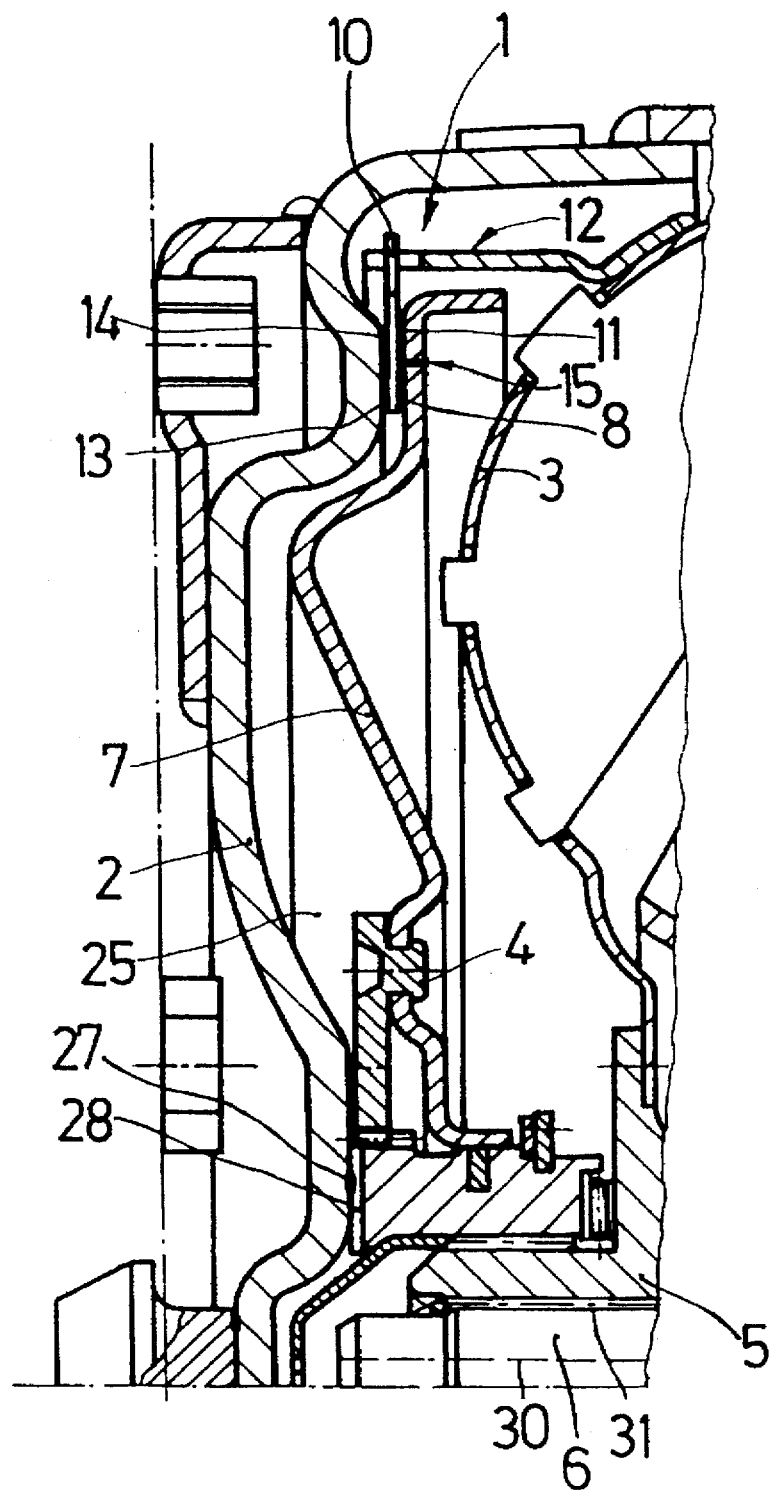
FIG. 1 shows the upper half of a section through a lockup clutch for a hydrokinetic torque converter with a multiplicity of friction surfaces and with a device for cooling them.

The basic structure of a lockup clutch is explained with reference to FIG. 1. The lockup clutch 1 interacts with a converter housing 2, only part of which is shown, and which is fastened to the crankshaft (not shown) of an internal combustion engine. Located in the converter housing 2 and at some axial distance from it is a turbine wheel 3 which is fastened to a turbine hub 5 which sits non-rotationally on an output shaft 6.

The lockup clutch 1 has a piston 7 which is non-rotationally connected by means of rivets 4 to the converter housing 2, and can be displaced from an idle position to a limited extent in the axial direction. The piston 7 is provided with a radially outward flat area 8, which can be brought into contact with a friction lining 11 which is fastened to a plate 10. The plate 10 is fastened non-rotationally, but so that it can move axially, to the turbine wheel 3 by means of a clamp 12. On its side facing away from the friction lining 11 it carries an additional friction lining 13, which can be brought into contact with a flat area 14 of the converter housing 2.

Figure 2:
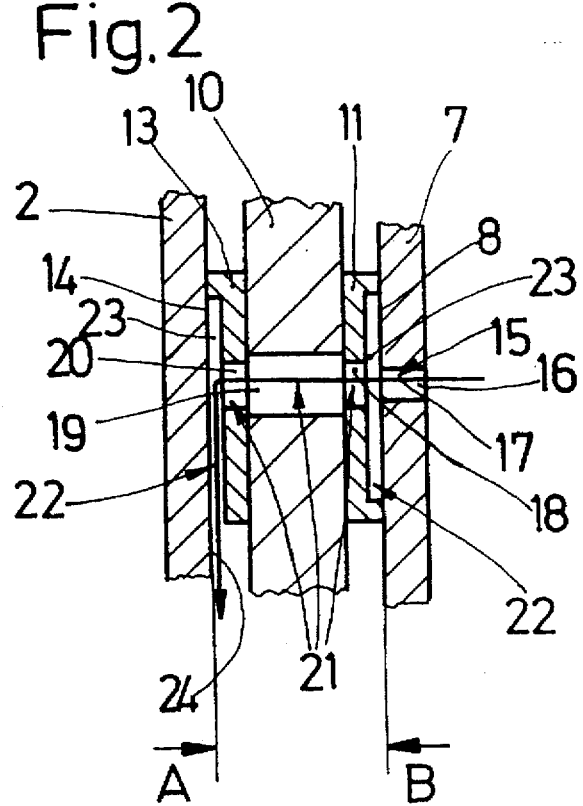
FIG. 2 is an enlarged detail of the device for cooling.
Figure 3:
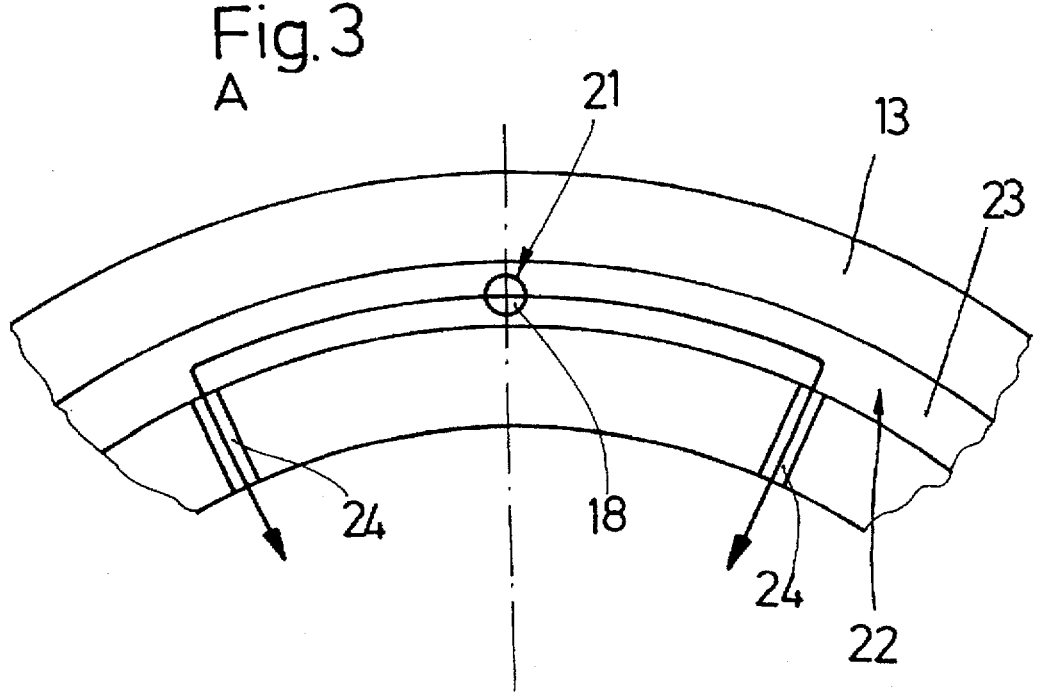
FIG. 3 is an illustration of the device for cooling, seen from direction A in FIG. 2.

The piston 7, as shown in greater detail in FIG. 2, is provided in the vicinity of friction linings 11 and 13 with a recess 15, preferably in the form of a continuous hole 16. The recess 15 has a very small cross section, so that it acts as a throttle 17 for the oil coming from the converter circuit. Aligned with this recess 15 are an opening 18 in the friction lining 11, an opening 19 in the plate 10 and an opening 20 in the friction lining 13. By means of these three openings 18, 19, 20, a connection 21 to a depression 22 in the friction lining 13 is created. An analogous depression 22 runs in the friction lining 11, whereby both depressions have the shape of a channel 23 which runs with a constant radius in the circumferential direction of the friction linings 11, 13. The depression 22 also has discharges 24 in the friction lining 13 connected to the channel 23, and leading radially inward. The discharges 24 empty with their respective inner ends into a chamber 25 (FIG. 1), which is defined on one side by the converter housing 2 and on the other side by the piston 7. Radially inside the chamber 25, an insert 27 is located between the turbine wheel hub 5 and the converter housing 2, and is designed with channels 28. By means of these channels, the oil flowing radially inward through the chamber 25 can reach the center of the torque converter, from where it can be pumped into a reservoir for oil by means of a central boring 30 in the output shaft 6.

At this point, it is appropriate to provide a brief description of the function of the lockup clutch 1. The converter housing 2, with the torque received from the internal combustion engine, drives a pump which causes the turbine wheel 3 to revolve by means of a hydraulic medium, preferably oil. The turbine wheel 3, via the turbine hub 5, transmits this revolving motion by means of gear teeth 31, by means of which the turbine hub 5 is engaged with the output shaft 6, to the output shaft, which is connected to a transmission in a manner not illustrated in the drawing. In this type of operation, there is theoretically some slip between a pump wheel (not shown) of the torque converter and the turbine wheel 3. To eliminate this slip under certain operating conditions, there is a lockup clutch 1 which, when the piston 7 is pressurized from the turbine wheel side, causes the piston 7 to be held in an active connection with the converter housing 2 by means of the friction linings 11, 13 and the plate 10. The torque is thereby transmitted directly from the converter housing 2 and from the piston 7, via the corresponding friction linings 11, 13, to the plate 10, and from the plate 10 via the clamp 12 to the turbine wheel 3, from where it is transmitted via the gear teeth 31 of the turbine hub 5 to the output shaft 6. The hydraulic transmission path through the lockup clutch 1 is therefore closed, and slip no longer takes place. To release the connection between the piston 7 and the converter housing 2, the side of the piston 7 facing the converter housing 2 is pressurized with hydraulic fluid by means of a corresponding supply line, whereupon the piston moves away from the converter housing 2, and thereby relieves the pressure on the plate 10 which is provided with the friction linings 11, 13. The transmission of torque to the friction linings 11, 13 and via the plate 10 and the clamp 12 to the turbine wheel 3 thereby ends.

If the lockup clutch 1 is functioning, when the side of the piston 7 facing the turbine wheel 3 is pressurized, there can be a relative movement of the converter housing 2 and of the piston 7 with respect to the plate 10, and thus with respect to the friction linings 11, 13 fastened to it, which results on one hand in slip on the friction lining between the friction lining 11 and the piston 7, and on the other hand between the friction lining 13 and the converter housing 2. On account of this slip, the friction linings heat up, but the corresponding converter components such as the converter housing 2 or the piston 7 heat up even more. For this reason, the depressions 22 are provided in the friction linings 11, 13 to carry a flow of cooling oil. This oil originates from the converter circuit, and is forced under pressure into the recess 15. On account of the small diameter of the recess 15, the oil flow experiences a significant loss of pressure before it enters the channel 23 of the friction lining 11, and via the connection 21, enters the channel 23 of the friction lining 13. On account of the pressure decrease in the recess 15, the oil flows through the channels 23 of the depressions 22 at a low pressure, so that there is no danger of separation phenomena of the plate 10 from the converter housing 2 or of the piston 7 from the plate 10. Accordingly, the flow of cooling oil can be routed via the connection 21, the plate 10 and the depressions 22 in the friction linings 11, 13, without the occurrence of separation losses, which would result in a reduction of the torque which can be transmitted by the lockup clutch 1.

After flowing through the depressions 22, the oil exits the friction lining 13 radially inward through the discharges 24 and arrives in the chamber 25, from where it travels, as described above, via the channels 28 of the insert 27 and the central boring 30 in the output shaft 6 into a storage container.

If, during test operations with the converter lockup clutch 1, it is determined that the volume of the oil flow is too small, this flow volume can easily be increased by enlarging the recess 15 in the piston 7, without having to intervene in the layout or the cross section of the depressions 22. If the recess 15 is in the form of a continuous hole 16, a simple enlargement of this recess is all that is necessary to increase the volume of the flow. The action of the recess 15 as a throttle 17 is thereby reduced, which slightly increases the oil pressure in the depressions 22. But this increase is not by a long shot as high as in lockup clutches without the recess 15 claimed by the invention, since in such lockup clutches, the oil flows through the friction linings unthrottled from radially outward to radially inward, and accordingly promotes the undesirable separation losses precisely in the radially outward area.

FIG. 5 illustrates a simplified embodiment of the lockup clutch 1, in which, fastened to the piston 7, there is a friction lining 35 which can be brought into contact with the converter housing 2 by means of its side facing away from the piston 7. As in the embodiment illustrated in FIG. 1, the piston 7 has a recess which is aligned with a connection 21 in the form of an opening 36. The latter is connected to a depression 22 which is formed just like the depression in the friction lining 13. In this embodiment, torques are transmitted from the converter housing 2 via the friction lining 35 to the piston 7, and from the piston 7, in a manner not shown, to the turbine wheel 3, from where the torque is transmitted via the turbine hub 5 and its gear teeth 31 to the output shaft 6. When the lockup clutch 1 is active, there can be a relative movement between the converter housing 2 and the piston 7, and thus slip between the converter housing 2 and the friction lining 35, as a result of which the friction lining 35 is heated, although the converter housing 2 is heated to an even greater extent. Therefore, by means of the recess 15, oil which arrives with pressure from the turbine wheel 3 is throttled, and is then transported via the connection 21 to the depression 22, where it cools the converter housing 2, and then flows radially inward into the chamber 25.

Figure 6:
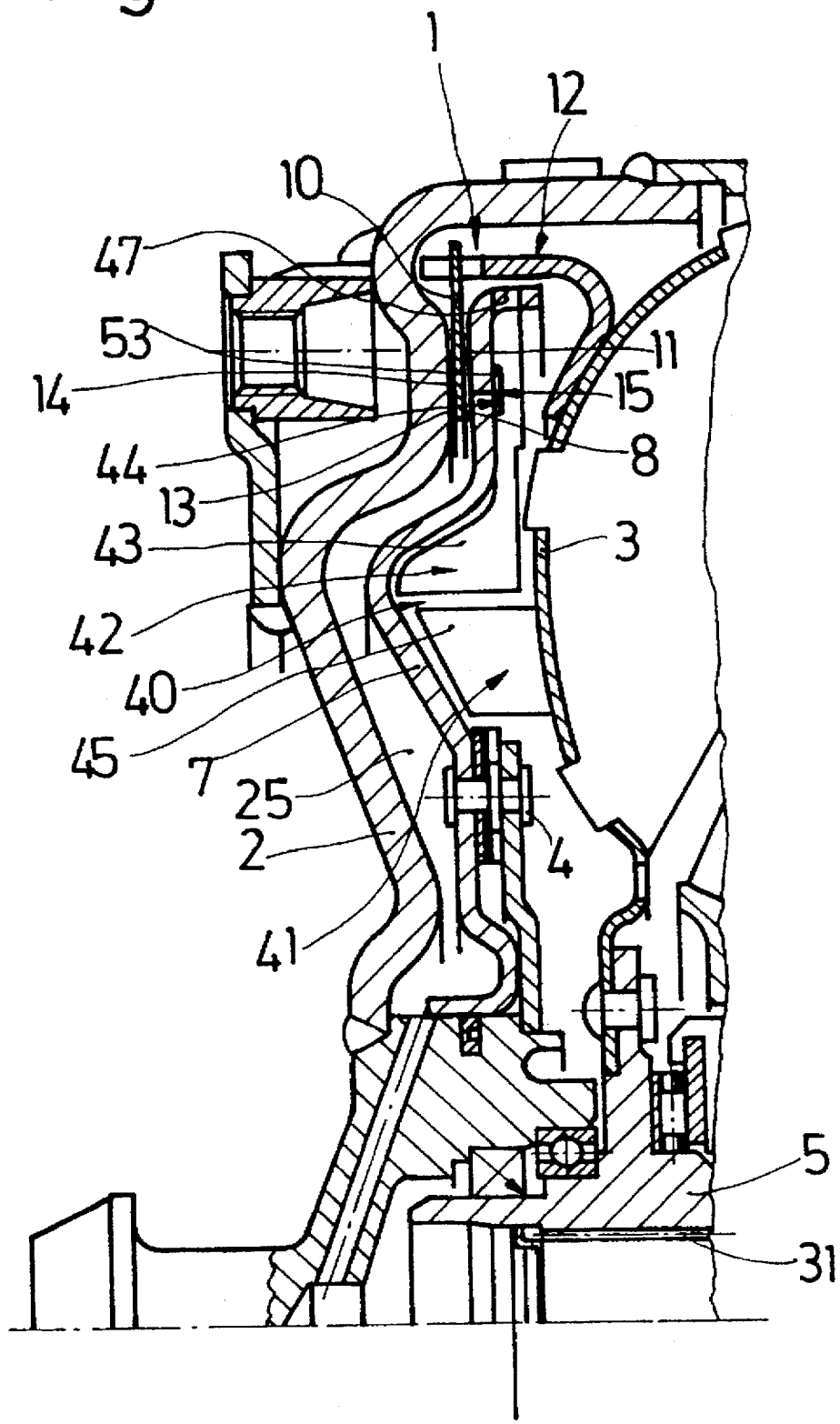
FIG. 6 is the same as FIG. 1, but with a closing device.
Figure 7:
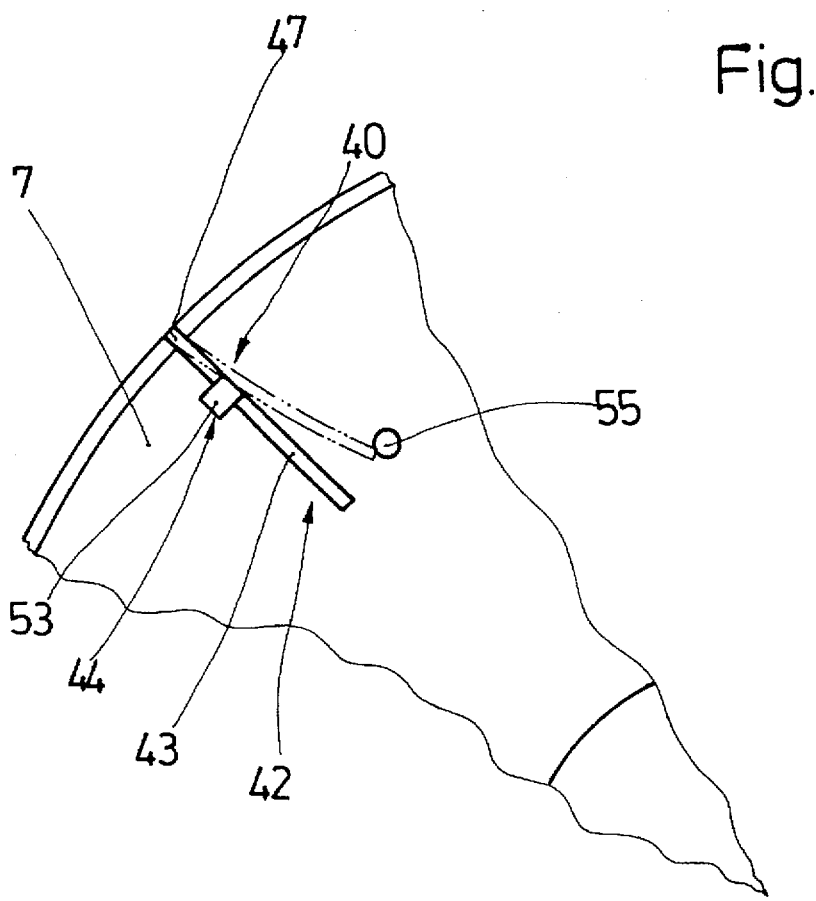
FIG. 7 is an enlarged detail of a closing device, showing a piston of the lockup clutch from the side of the converter unit.

As shown in FIG. 6, on the turbine wheel 3 there is a first blade ring 41, and on the side of the piston 7 facing the turbine wheel 3 there is a second blade ring 42 of a closing device 40 for the recess 15. The first blade ring 41 has a plurality of rigid blades 45 which are located at equal intervals from one another, while the second blade ring 42 is provided with one blade 43, which in the radially outward area has a fixation point 47 on the piston 7, and is therefore firmly connected to the latter in the direction of revolution. Starting from this fixation point 47, radially inward, the blade 43 can be deformed in the circumferential direction on account of its high elasticity. Specifically, the deformation is greater, the greater the distance from the fixation point 47. In the area of the recess 15 in the piston 7, the blade 43 is provided with a bracket 53 which extends in the circumferential direction and acts as a closing element 44 for the recess 15. This bracket 53, viewed in the axial direction, is held in contact with the recess 15. The operation is then as follows: When there is slip between the converter housing 2 and the plate 10 on one hand, and between the piston 7 and the plate 10 on the other hand, a significant amount of heat is generated on the friction linings 11 and 13, which heat must be discharged. On account of this slip, the turbine wheel is driven via the clamp 12 by the plate 10, and executes a relative motion with respect to the converter housing 2 and the piston 7, so that there is a speed differential between the two blade rings 41 and 42. This speed differential, for hydrodynamic reasons, results in the generation of a peripheral force between the blades 45 of the first blade ring 41 and the blade 43 of the second blade ring 42, whereby this peripheral force increases with the square of the speed differential. As the peripheral force increases, it triggers an elastic deformation of the blade 43 in the circumferential direction, and the bracket 53, viewed in the circumferential direction, is displaced with respect to the recess 15, and in particular by a greater distance, the more the blade 43 is displaced from its idle position by the peripheral force. A limitation of this displacement can be achieved by a stop 55 which corresponds to the blade 43 and is located on the side away from the side on which the peripheral force acts, and against which the blade 43 comes in contact. The recess 15 is accordingly opened to the maximum when the slip on the friction linings 11, 13 has reached a specified maximum. Oil coming from the converter housing 2 can accordingly flow to the full extent through the recess 15 into the channels 23 of the depressions 22 in the friction linings 11 and 13, to cool the latter. Consequently, the maximum flow of cooling oil occurs precisely when, on account of the high degree of slip, there is a great deal of heat in the friction linings 11, 13 which must then be discharged.

When the slip is reduced, and thus when a reduced amount of heat is generated, the speed differential between the two blade rings 41 and 42 is reduced, and thus the amount of the peripheral force is reduced, so that the blade 43, which was displaced only elastically, can spring back into its starting position, and at least partly reclose the recess 15 by means of the bracket 53.

If there are a number of recesses 15 in the piston 7, distributed over the circumference, and these recesses must be opened in multiple stages, it is possible to assign each recess 15 its own blade 43, whereby the blades 43 can be realized so that they have different rigidities in the circumferential direction. A different rigidity can thereby be achieved by means of a number of factors, e.g. by modifying the distance of the bracket 53 from the fixation point 47, by the selection of the construction of the blade 63, which then acts as a bending beam, and by the selection of the material, as well as the thickness of the blades 43 in the circumferential direction. The number of stages in which the recesses 15 can be actuated can be specified as a function of how many different blades 43 are integrated into or fixed to the second blade ring 42. The flow of the oil into the friction linings 11, 13 can thereby be very precisely regulated.

Figure 8:
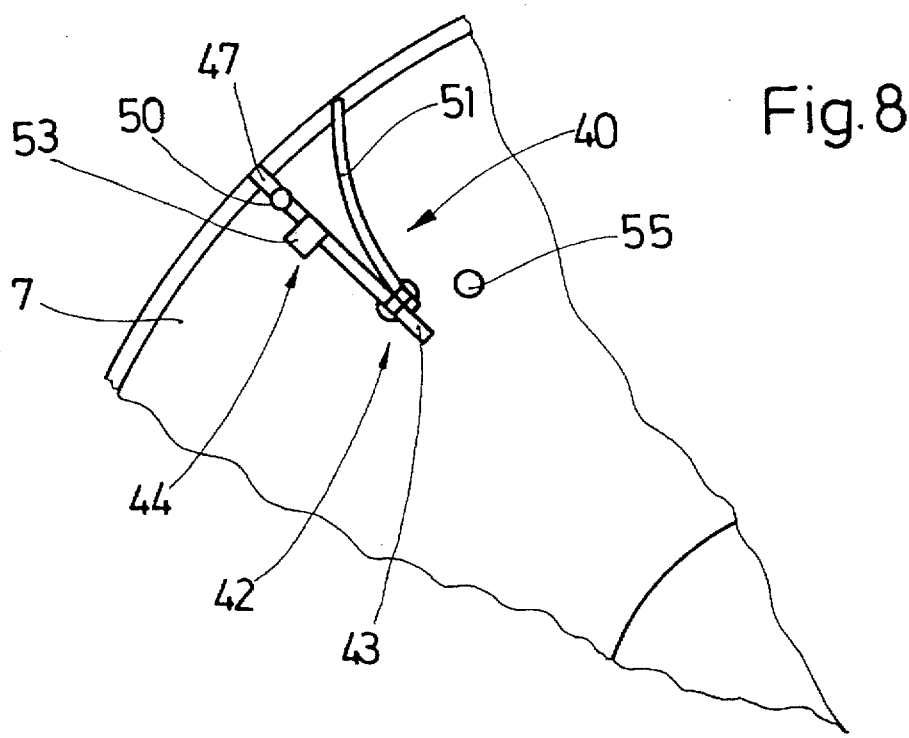
FIG. 8 is the same as FIG. 7, but with another embodiment of the closing device.

The blade 43 can be very rigid, if it is attached in a hinged manner by means of a hinge joint 50 (FIG. 8) in the circumferential area of the piston 7 so that it can be displaced in the circumferential direction. At least one energy storage device 51, shown in FIG. 8 in the form of a leaf spring, guarantees that the blade 43 is held in its idle position as long as no peripheral force is being exerted on it. As soon as the peripheral force is exerted as a result of a speed differential between the two blade rings 41 and 42, it displaces the blade 43 against the action of the energy storage device 51, whereby the blade 43 executes a pivoting motion around the hinge joint 50. Of course, during this movement, the bracket 53 is moved along with it, and the corresponding recess 15 is opened. When the slip on the friction linings 11, 13 is reduced, and thus when the speed differential between the two blade rings 41 and 42 decreases, the peripheral force decreases, so that the energy storage devices 51 can relax once again, and the blade can be pushed back into its rest position. The bracket 53 then closes the recess 15 once again.

The range of displacement of a blade 43 which is fastened to the piston 7 by means of a hinge joint 50 can be controlled by means of a stop 55 to limit the displacement, just as on the blade 43 which is elastic in the circumferential direction. It is also conceivable, when a multiplicity of blades 43 are used, each of which corresponds to a recess 15, that the energy storage devices 51 can be designed with different spring constants and thus different deformation resistances, thereby achieving a multi-stage opening action of the closing device 40.

Types of torque converters and components therefor, which may be utilized in accordance with the embodiments of the present invention may be found in the following U.S. Pat. No. 4,478,323 to Weissenberger on Oct. 23, 1984, entitled "Hydrodynamic Clutch with Torsional Vibration Damping"; U.S. Pat. No. 4,437,551 to Gimmler on Mar. 20, 1984, entitled "Hydrodynamic Torque Converter"; U.S. Pat. No. 5,065,853 to Fujimoro et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; and U.S. Pat. No. 4,071,125 to Jameson on Jan. 31, 1978, entitled "Power Transmission with Torque Converter Lockup Clutch".

U.S. Pat. No. 5,215,173 issued to Gimmler on Jun. 1, 1993 and entitled "Hydrodynamic Torque Converter" is the U.S. counterpart of German Patent No. 41 21 586 A1 and is hereby expressly incorporated by reference herein.

One feature of the invention resides broadly in the hydrodynamic torque converter with a lockup clutch which comprises a piston which can be displaced in the axial direction and can be connected to the converter housing by means of at least one friction lining, which piston, on its side facing the converter housing, defines a chamber in which, when the lockup clutch is active, a pressure is applied which is lower than the pressure in the converter circuit, and in the vicinity of the friction surface there is at least one depression for the flow of hydraulic fluid from the converter circuit, preferably oil, which empties into the chamber in the vicinity of the radially inner end of the friction lining, characterized by the fact that the depression 22 is connected to the converter circuit by means of at least one connection 21 to at least one recess 15 formed in the piston 17, whereby the recess 15 is designed with a smaller cross section than the connection 21 with the depression 22 or than the latter, to cause a pressure reduction with respect to the pressure in the converter circuit.

Another feature of the invention resides broadly in the hydrodynamic torque converter characterized by the fact that the connection 21 runs through at least one component 10, 11, 13; 21 of the lockup clutch, and runs at a specified angle with respect to the respective depression 22.

Yet another feature of the invention resides broadly in the hydrodynamic torque converter characterized by the fact that the connection 21 runs through a multiplicity of converter components 10, 11, 13 provided between the piston 7 and the converter housing 2, and has a corresponding cross section surface in each converter component 10, 11, 13.

Still another feature of the invention resides broadly in the hydrodynamic torque converter characterized by the fact that the connection 21 has a circular cross section.

A further feature of the invention resides broadly in the hydrodynamic torque converter characterized by the fact that the depression 22 is formed by at least one channel 23 which runs in the circumferential direction of the friction lining 11, 13, 35 and at least one discharge 24 which leads radially inward.

Another feature of the invention resides broadly in the hydrodynamic torque converter characterized by the fact that there are a multiplicity of recesses 15 in the piston 7, at least some of which are provided with a closing device 40 which can be actuated as a function of the torque to be transmitted.

Yet another feature of the invention resides broadly in the hydrodynamic torque converter characterized by the fact that there are a multiplicity of closing devices 40, each of which closes the respective recess 15 at a specified torque.

Still another feature of the invention resides broadly in the hydrodynamic torque converter characterized by the fact that the closing device 40 has a first blade ring 41 which is firmly connected to the turbine wheel 3, and a second blade ring 42 located next to the first blade ring 41 and fastened to the piston 7 on its side facing the turbine wheel 3, which second blade ring 42 has at least one blade 43, which is provided as a carrier for one closing element 44 per recess 15 in the piston 7, and can be displaced from its idle position under of the action of a peripheral force produced by relative rotation between the blade rings 41, 42, carrying along with it the closing element 44 which thereby exposes the corresponding recess 15.

A further feature of the invention resides broadly in the hydrodynamic torque converter characterized by the fact that the blade 43 is defined so that it has a specified elasticity in the circumferential direction, and has at least one fixation point 47 on the piston 7, with respect to which the blade 43 can be deformed by the peripheral force, thereby generating a relative motion of the closing element 44 with respect to the recess 15.

Another feature of the invention resides broadly in the hydrodynamic torque converter characterized by the fact that the blade 43 is engaged at the fixation point 47 on the piston 7 by means of a hinge joint 50, whereby the hinge joint 50 effects a displacement of the blade 43 from its rest position, against the action of at least one energy storage device 51 on which the blade 43 is supported against the peripheral force, and which displacement can be triggered by the peripheral force.

Yet another feature of the invention resides broadly in the hydrodynamic torque converter characterized by the fact that molded on the blade 43 is a bracket 53 which acts as a closing element 44 for the corresponding recess 15, and is removed from the recess 15 when the blade 43 is displaced from its idle position.

Still another feature of the invention resides broadly in the hydrodynamic torque converter characterized by the fact that there are a multiplicity of blades 43 for a corresponding number of recesses 15, which blades 43 are realized with at least two different rigidities in the circumferential direction.

A further feature of the invention resides broadly in the hydrodynamic torque converter characterized by the fact that there are a multiplicity of blades 43 for a corresponding number of recesses 15, the corresponding springs 51 of which are realized with at least two different spring constants.

Another feature of the invention resides broadly in the hydrodynamic torque converter characterized by the fact that for each blade 43 there is a stop 55, by means of which the displacement of the blade 43 in the direction of the peripheral force can be limited.

Yet another feature of the invention resides broadly in the hydrodynamic torque converter characterized by the fact that the blade 43 is fixed on one end, preferably on its radially outside end, to the piston 7.

Still another feature of the invention resides broadly in the hydrodynamic torque converter characterized by the fact that the first blade ring 41 is located radially inside the second blade ring 42.

A further feature of the invention resides broadly in the hydrodynamic torque converter characterized by the fact that the at least one recess 15 has a circular cross section.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos. P 195 08 855.7, filed Mar. 11, 1995 and P 44 36 276.5, filed on Oct. 11, 1994, having inventor Hans-Wilhelm Weinholt, and DE-OS P 195 08 855.7 and P 44 36 276.5 and DE-PS P 195 08 855.7 and P 44 36 276.6.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Hydrodynamic torque converter with a lockup clutch which comprises a piston which can be displaced in the axial direction and can be connected to the converter housing by means of at least one friction lining, which piston, on its side facing the converter housing, defines a first chamber, and which piston, on its side facing away from the converter housing, defines a second chamber comprising a converter circuit, a pressure being applied in the first chamber, when the lockup clutch is active, which is lower than the pressure in the converter circuit, and in the vicinity of the friction surface there is at least one depression for the flow of hydraulic fluid from the converter circuit which empties into the first chamber in the vicinity of a radially inner end of the friction lining, wherein the depression is connected to the converter circuit by means of at least one connection to at least one recess formed in the piston, whereby the recess is designed with a smaller cross section than the connection with the depression or than the latter, to cause a pressure reduction with respect to the pressure in the converter circuit to minimize disengagement of the lockup clutch upon engagement of the lockup clutch, wherein the connection runs through a multiplicity of converter components provided between the piston and the converter housing, the connection having a cross section area through each of the multiplicity of converter components provided between the piston and the converter housing.

2. Hydrodynamic torque converter as claimed in claim 1, wherein the connection has a circular cross section.

3. Hydrodynamic torque converter with a lockup clutch which comprises a piston which can be displaced in the axial direction and can be connected to the converter housing by means of at least one friction lining, which piston, on its side facing the converter housing, defines a first chamber, and which piston, on its side facing away from the converter housing, defines a second chamber comprising a converter circuit, a pressure being applied in the first chamber, when the lockup clutch is active, which is lower than the pressure in the converter circuit, and in the vicinity of the friction surface there is at least one depression for the flow of hydraulic fluid from the converter circuit which empties into the first chamber in the vicinity of a radially inner end of the friction lining, wherein the depression is connected to the converter circuit by means of at least one connection to at least one recess formed in the piston, whereby the recess is designed with a smaller cross section than the connection with the depression or than the latter, to cause a pressure reduction with respect to the pressure in the converter circuit to minimize disengagement of the lockup clutch upon engagement of the lockup clutch, wherein the depression is formed by at least one channel which runs in the circumferential direction of the friction lining and at least one discharge which leads radially inward.

4. Hydrodynamic torque converter with a lockup clutch which comprises a piston which can be displaced in the axial direction and can be connected to the converter housing by means of at least one friction lining, which piston, on its side facing the converter housing, defines a first chamber, and which piston, on its side facing away from the converter housing, defines a second chamber comprising a converter circuit, a pressure being applied in the first chamber, when the lockup clutch is active, which is lower than the pressure in the converter circuit, and in the vicinity of the friction surface there is at least one depression for the flow of hydraulic fluid from the converter circuit which empties into the first chamber in the vicinity of a radially inner end of the friction lining, wherein the depression is connected to the converter circuit by means of at least one connection to at least one recess formed in the piston, whereby the recess is designed with a smaller cross section than the connection with the depression or than the latter, to cause a pressure reduction with respect to the pressure in the converter circuit to minimize disengagement of the lockup clutch upon engagement of the lockup clutch, wherein there are a multiplicity of recesses in the piston, at least some of which are provided with a closing device which can be actuated as a function of the torque to be transmitted.

5. Hydrodynamic torque converter as claimed in claim 4, wherein there are a multiplicity of closing devices, each of which closes the respective recess at a specified torque.

6. Hydrodynamic torque converter as claimed in claim 4, wherein the at least one recess has a circular cross section.

7. Hydrodynamic torque converter with a lockup clutch which comprises a piston which can be displaced in the axial direction and can be connected to the converter housing by means of at least one friction lining, which piston, on its side facing the converter housing, defines a first chamber, and which piston, on its side facing away from the converter housing, defines a second chamber comprising a converter circuit, a pressure being applied in the first chamber, when the lockup clutch is active, which is lower than the pressure in the converter circuit, and in the vicinity of the friction surface there is at least one depression for the flow of hydraulic fluid from the converter circuit which empties into the first chamber in the vicinity of the radially inner end of the friction lining, wherein the depression is connected to the converter circuit by means of at least one connection to at least one recess formed in the piston, whereby the recess is designed with a smaller cross section than the connection with the depression or than the latter, to cause a pressure reduction with respect to the pressure in the converter circuit;

wherein there are a multiplicity of recesses in the piston, at least some of which are provided with a closing device which can be actuated as a function of the torque to be transmitted;

wherein there are a multiplicity of closing devices, each of which closes the respective recess at a specified torque; and wherein the closing device has a first blade ring which is firmly connected to the turbine wheel, and a second blade ring located next to the first blade ring and fastened to the piston on its side facing the turbine wheel, which second blade ring has at least one blade, which is provided as a carrier for one closing element per recess in the piston, and can be displaced from its idle position under of the action of a peripheral force produced by relative rotation between the blade rings, carrying along with it the closing element which thereby exposes the corresponding recess.

8. Hydrodynamic torque converter as claimed in claim 7, wherein the blade is defined so that it has a specified elasticity in the circumferential direction, and has at least one fixation point on the piston, with respect to which the blade can be deformed by the peripheral force, thereby generating a relative motion of the closing element with respect to the recess.

9. Hydrodynamic torque converter as claimed in claim 8, wherein there are a multiplicity of blades for a corresponding number of recesses, different blades of the multiplicity of blades having different rigidities in the circumferential direction.

10. Hydrodynamic torque converter as claimed in claim 8, wherein the blade is fixed on its radially outside end, to the piston.

11. Hydrodynamic torque converter as claimed in claim 7, wherein the blade is engaged at the fixation point on the piston by means of a hinge joint, whereby the hinge joint effects a displacement of the blade from its rest position, against the action of at least one energy storage device on which the blade is supported against the peripheral force, and which displacement can be triggered by the peripheral force.

12. Hydrodynamic torque converter as claimed in claim 11, wherein molded on the blade is a bracket which acts as a closing element for the corresponding recess, and is removed from the recess when the blade is displaced from its idle position.

13. Hydrodynamic torque converter as claimed in claim 11, wherein there are a multiplicity of blades for a corresponding number of recesses, wherein each of the multiplicity of blades is biased by a spring element, wherein a spring element biasing a first of the multiplicity of blades has a first spring constant, wherein a spring element biasing a second of the multiplicity of blades has a second spring constant, and wherein said first spring constant of said first spring element is substantially different from said second spring constant of said second spring element.

14. Hydrodynamic torque converter as claimed in claim 7, wherein for each blade there is a stop, by means of which the displacement of the blade in the direction of the peripheral force can be limited.

15. Hydrodynamic torque converter as claimed in claim 7, wherein the first blade ring is located radially inside the second blade ring.

* * * * *